(12) United States Patent
Miller

(10) Patent No.: US 9,114,994 B2
(45) Date of Patent: Aug. 25, 2015

(54) CARBON NANOTUBE SEPARATION BY REVERSIBLE GELATION

(71) Applicant: EMPIRE TECHNOLOGY DEVELOPMENT LLC, Wilmington, DE (US)

(72) Inventor: Seth Adrian Miller, Englewood, CO (US)

(73) Assignee: Empire Technology Development LLC, Wilmington, DE (US)

( * ) Notice: Subject to any disclaimer, the term of this patent is extended or adjusted under 35 U.S.C. 154(b) by 317 days.

(21) Appl. No.: 13/657,659

(22) Filed: Oct. 22, 2012

(65) Prior Publication Data
US 2013/0284986 A1    Oct. 31, 2013

Related U.S. Application Data

(63) Continuation of application No. 12/506,148, filed on Jul. 20, 2009, now Pat. No. 8,308,955.

(51) Int. Cl.
| | | |
|---|---|---|
| *B01J 20/28* | (2006.01) | |
| *B01J 20/26* | (2006.01) | |
| *B01D 11/02* | (2006.01) | |

(Continued)

(52) U.S. Cl.
CPC ........ *C01B 31/0266* (2013.01); *B01D 11/0288* (2013.01); *B01J 13/0052* (2013.01); *B01J 13/0065* (2013.01); *B01J 13/0069* (2013.01); *B01J 20/28047* (2013.01); *B82Y 30/00* (2013.01); *B82Y 40/00* (2013.01); *C01B 31/026* (2013.01); *C01B 31/0273* (2013.01); *C01B 2202/22* (2013.01)

(58) Field of Classification Search
CPC ............. B01D 11/0217; B01D 11/028; B01D 11/0284; B01D 11/0288; B01D 11/12; B01D 21/262; B01D 17/12; B01D 17/0217; B01D 11/02; B01D 15/08; B01D 15/38; C01B 31/02; C01B 31/022; C01B 31/0226; C01B 31/0246; C01B 31/026; C01B 31/0253; C01B 2202/22; C01B 31/0222; C01B 31/0266; C01B 31/0273; C08J 3/02; C08J 3/03; C08J 3/075; C08J 3/09; C08J 3/096; B01J 13/00; B01J 13/0052; B01J 13/0065; B01J 13/0069; B01J 20/22; B01J 20/26; B01J 20/28; B01J 20/28047; B82Y 30/00; B82Y 40/00; G05B 19/408
USPC ......... 210/634, 639, 770–774, 787, 806, 702, 210/749; 423/447.1, 460, 461; 977/742–746, 845–847; 204/456, 462, 204/469, 470; 700/266, 273; 516/98, 102
See application file for complete search history.

(56) References Cited

U.S. PATENT DOCUMENTS

| | | | |
|---|---|---|---|
| 3,884,861 A | 5/1975 | Whitworth et al. | |
| 7,008,563 B2 * | 3/2006 | Smalley et al. | 252/511 |

(Continued)

OTHER PUBLICATIONS

Maeda et al, "Dispersion and Separation of Small-Diameter Single-Walled Carbon Nanotubes", Journal of American Chemical Society (JACS) 2006, vol. 128, pp. 12239-12242, Published on Web Aug. 29, 2006.*

(Continued)

*Primary Examiner* — Joseph Drodge
(74) *Attorney, Agent, or Firm* — Turk IP Law, LLC

(57) ABSTRACT

Embodiments described herein generally relate to the separation of carbon nanotubes by reversible gelation.

18 Claims, 7 Drawing Sheets

(51) Int. Cl.
*B01D 15/38* (2006.01)
*C01B 31/02* (2006.01)
*B01J 13/00* (2006.01)
*B82Y 30/00* (2011.01)
*B82Y 40/00* (2011.01)

(56) References Cited

U.S. PATENT DOCUMENTS

| | | | |
|---|---|---|---|
| 7,131,537 B2 | 11/2006 | Papadimitrakopoulos | |
| 7,615,351 B2 | 11/2009 | McMaster et al. | |
| 7,737,188 B2* | 6/2010 | McGown et al. | 516/106 |
| 8,308,930 B2* | 11/2012 | Kim et al. | 205/96 |
| 8,308,955 B2* | 11/2012 | Miller | 210/639 |
| 2004/0232073 A1 | 11/2004 | Papadimitrakopoulos | |
| 2006/0099135 A1* | 5/2006 | Yodh et al. | 423/447.1 |
| 2007/0078966 A1* | 4/2007 | Bromley | 709/224 |
| 2008/0069758 A1* | 3/2008 | Campbell | 423/445 B |
| 2008/0227672 A1* | 9/2008 | Crews et al. | 507/260 |
| 2009/0111897 A1* | 4/2009 | McGown et al. | 516/102 |
| 2010/0044230 A1* | 2/2010 | Papadimitrakopoulos et al. | 204/547 |
| 2010/0278714 A1 | 11/2010 | Tanaka et al. | |
| 2011/0089944 A1* | 4/2011 | Shih et al. | 324/307 |
| 2011/0110842 A1* | 5/2011 | Haddon | 423/447.1 |
| 2011/0256536 A1 | 10/2011 | McMaster et al. | |

OTHER PUBLICATIONS

Heller et al, "Concomitant Length and Diameter Separation of Single-Walled Carbon Nanotubes", Journal of American Chemical Society (JACS) 2004, vol. 126, pp. 14567-14573, Published on Web Nov. 3, 2004.*

Melburne C. Lemieux, Mark Roberts, Soumendra Barman, Yong Wan Jin, Jong Min Kim, Shenan Bao, Self-Sorted, Aligned Nanotube Networks for Thin Film Transistors, Science Magazine 321, pp. 101-104, Jul. 4, 2008.

Debjit Chattopadhyay, Izabela Galeska, Fotios Papadimitrakopoulos, A Route for Bulk Separation of Semiconducting from Metallic Single-Wall Carbon Nanotubes, Journal of the American Chemical Society 125, pp. 3370-3375, Feb. 22, 2003.

Tanaka et al, Simple and scalable gel-based separation of metallic and semiconducting carbon nanotubes, Nano Letters 2009, vol. 9, No. 4, pp. 1497-1500, published on the web Feb. 25, 2009.

Tanaka et al, High-yield separation of metallic and semiconducting single-wall carbon nanotubes by agragose gel electrophoresis,Nanotechnology Research Institute, Kawaguchi, Saitama 330-0012, Japan, published on the web Nov. 14, 2008.

* cited by examiner

800 A computer program product.

802 A signal bearing medium.

804 at least one of one or more instructions for formatting data to instruct a process unit to add a gelling agent to a solution having a first type of carbon nanotubes and a second type of carbon nanotubes to form a gel;

one or more instructions for formatting data to instruct a process unit to compact the gel to form a compacted gel and a liquid;

one or more instructions for formatting data to instruct a process unit to remove at least a portion of the liquid;

one or more instructions for formatting data to instruct a process unit to remove at least a portion of the first type of carbon nanotubes from the liquid;

one or more instructions for formatting data to instruct a process unit to disperse the compacted gel to form a dispersed gel;

one or more instructions for formatting data to instruct a process unit to remove at least a portion of the second type of carbon nanotubes from the dispersed gel;

one or more instructions for formatting data to instruct a process unit to add a gel to a solution having a first type of carbon nanotubes and a second type of carbon nanotubes to form an expanded gel;

one or more instructions for formatting data to instruct a process unit to compact the expanded gel to form a compacted gel and a liquid;

one or more instructions for formatting data to instruct a process unit to remove at least a portion of the liquid;

one or more instructions for formatting data to instruct a process unit to remove at least a portion of the first type of carbon nanotubes from the liquid;

one or more instructions for formatting data to instruct a process unit to disperse the compacted gel to form a dispersed gel; or one or more instructions for formatting data to instruct a process unit to remove at least a portion of the second type nanotubes from the dispersed gel.

| 806 a computer-readable medium. | 808 a recordable medium. | 810 a communications medium. |

FIG. 8

CARBON NANOTUBE SEPARATION BY REVERSIBLE GELATION

CROSS-REFERENCE TO RELATED APPLICATIONS

The present application is a continuation under 35 U.S.C. §120 of U.S. patent application Ser. No. 12/506,148, filed Jul. 20, 2009, now Pat. No. 8,308,955, issued Nov. 13, 2012, the entire contents of which are incorporated herein by reference.

BACKGROUND

1. Technical Field

The present disclosure relates generally to separation of carbon nanotubes and, more specifically, to separation of carbon nanotubes by reversible gelation.

2. Background

Carbon nanotubes or materials including carbon nanotubes may offer desirable properties in a variety of applications, such as nanotechnology, electronics, coatings and optics, for example. In some instances, it may be necessary to separate carbon nanotubes by type, by defect type or by defect rate. Current methods for separating carbon nanotubes may be difficult and may not be economical for many applications.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 8 illustrates an example computer program product; and

DETAILED DESCRIPTION

Figure 1:
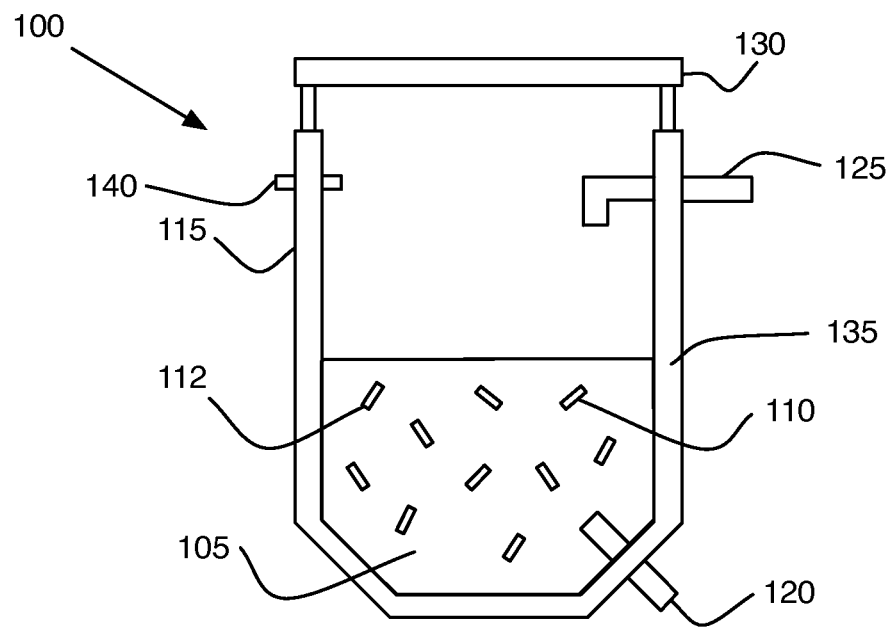
FIGS. 1-5 illustrate an example method for separating carbon nanotubes.

The following description sets forth various examples along with specific details to provide a thorough understanding of claimed subject matter. It will be understood by those skilled in the art, however, that the claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

This disclosure is drawn, inter alia, to methods, apparatus, computer programs, and systems related to carbon nanotube purification and separation by reversible gelation.

In the following description, algorithms and/or symbolic representations of operations on data bits and/or binary digital signals stored within a computing system, such as within a computer and/or computing system memory may be presented. An algorithm may generally be considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, parameters, numerals, etc. Those skilled in the art in light of the present disclosure will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a wireless node or hub, that manipulates and/or transforms data represented as physical quantities including electronic and/or magnetic quantities within the computing platform's processors, memories, registers, etc.

In some implementations of synthesizing or producing carbon nanotubes, it may not be possible to specify which type of carbon nanotubes are produced. In various production techniques two or more types of carbon nanotubes may be formed. For example, in some processes, metallic and semiconducting carbon nanotubes may be formed (along with varying amounts of amorphous carbon). In this context, semiconducting carbon nanotubes and metallic carbon nanotubes may be formed using the same process or processes and may include substantially the same materials, and the semiconducting and metallic distinction may be made based at least in part on the electrical characteristics of the carbon nanotubes. For example, metallic carbon nanotubes may be substantially conductive or suitable for applications where a conducting material may be desirable and semiconducting carbon nanotubes may be substantially semiconductive or may be suitable for applications where semiconductive materials may be desirable. For some applications, it may be desirable to use only one type of carbon nanotube such that a pure or relatively pure group of carbon nanotubes may be required. For example, semiconducting carbon nanotubes may be desired for semiconductor implementations, such as transistor device formation, or the like. In other examples, metallic carbon nanotubes may be desired for conductive implementations, such as device interconnects, package interconnects, transparent conductive coatings or the like. Metallic carbon nanotubes may be idealized and may be highly conductive such that they may transport electrons ballistically. Semiconducting carbon nanotubes may include defects that may provide their semiconductive nature.

In various implementations, a mixture of two or more types of carbon nanotubes may be provided for purification or separation. The mixture may be formed by any suitable carbon nanotube preparation process. In an example, the mixture may include metallic carbon nanotubes and semiconducting carbon nanotubes. In some examples, any amorphous carbon remaining after the formation of the carbon nanotubes may be removed from the mixture by a suitable method. In an example, the mixture may be provided as carbon nanotubes dispersed in a solvent.

In an embodiment, a gelling agent, such as, for example, a bi-functional or poly-functional amine, may be added to the dispersed solution of, for example, two types of carbon nanotubes to form a gel by substantially cross linking between the gelling agent and the carbon nanotubes. The gel may be compacted to form a compacted gel and a liquid. The compacted gel may be rich in one type of carbon nanotubes and the liquid may be rich in another type of carbon nanotubes. The liquid and the gel may be separated and the two types of carbon nanotubes may be removed or purified from the liquid and the gel, respectively. In some examples, the gel may be re-dispersed before the carbon nanotubes are purified from the gel to make the process simpler, less time consuming and more economical. In some examples, the desired purity of carbon nanotubes in the liquid and the gel may be obtained in one batch process separation. In other examples, the separation may be repeated, for example, by redispersing the gel, optionally adding additional solvent, compacting the (redispersed) gel, and separating the liquid and the gel for purification. Such a procedure may be repeated as necessary to meet a desired purity. In other examples, the liquid may not be of a desired purity and a separation procedure may be repeated, for example, by adding a gelling agent to form another gel, compacting the gel to form a compacted gel and liquid, and removing the liquid for purification. Such a procedure may be repeated as necessary to meet a desired purity. In some examples, the procedure may be implemented under the control of a computer system.

In another embodiment, a gel including, for example, an amine, may be added to or exposed to the dispersed solution of, for example, two types of carbon nanotubes to form an expanded gel. The expanded gel may be formed by the gel swelling to include at least portions of the carbon nanotubes and the solution. The expanded gel may be compacted to form a compacted gel rich in one type of carbon nanotubes and a liquid rich in another type of carbon nanotubes. The liquid and the compacted gel may be separated and the carbon nanotubes may be purified from the gel and the liquid. In some examples, the desired separation may be attained in a single separation process. In other examples, the gel or the liquid or both may be subjected to repeated separation processing (any number of times) to attain a desired or predetermined purity. In some examples, the procedure may be implemented under the control of a computer system.

In various embodiments, the gels discussed herein may include thermoreversible gels such that, for example, the gel may be re-suspended from compaction by heat treatment, agitation or the like. In some examples, the gels may include amines and various carbon nanotubes, such as semiconducting carbon nanotubes, may bind preferentially to the amines or they may be strongly entrained in the gel such that a gel phase may be rich in one or more types of carbon nanotubes and a liquid phase may be rich in one or more other types of carbon nanotubes.

FIGS. 1-5 illustrate an example method for separating carbon nanotubes in accordance with at least some embodiments of the present disclosure. As illustrated in cross section in FIG. 1, a process unit 100 may include a vessel 115, a port 120, a port 125, a cover 130, a process jacket 135, and a pressure port 140. Process jacket 135 may be used to provide heating and/or cooling by, for example, running a fluid in the jacket. In some examples, process port 140 may be used in various process steps to force liquid or gels out of port 120 and/or port 125. The process unit may optionally include an agitator or a stirrer, which is not shown for the sake of clarity of presentation. In some examples, process unit 100 may be capable of providing centrifugation, for example, by being housed to a centrifugation chamber or by being configured to be housed and removed from a centrifugation chamber.

A solution 105 including dispersed carbon nanotubes 110, 112 may be added to vessel 115 in any suitable manner, such as, for example, by removing cover 130 or through port 125. In some examples, solution 105 may be added to vessel 115 under the control of a computer system. Several carbon nanotubes are illustrated for the sake of clarity, however, any number of carbon nanotubes may be provided for separation. In various examples, thousands, millions, billions, several moles, or more carbon nanotubes may be provided. Carbon nanotubes 110, 112 may be of different types. In an example, carbon nanotubes 110 may be metallic carbon nanotubes and carbon nanotubes 112 may be semiconducting carbon nanotubes. In some examples, more than two types of carbon nanotubes may be provided in solution 105. In other examples, the carbon nanotubes to be separated may include, for example, various types of single-walled carbon nanotubes, various types of multi-walled carbon nanotubes or the like. Any carbon nanotubes that may have different affinities or miscibilities for inclusion in a gel phase versus a liquid phase may be separated by the methods discussed. The carbon nanotubes may be dispersed in any suitable solvent. In an example, the solvent may be water.

Solution 105 may be attained or provided in any suitable manner. In some examples, solution 105 may be formed by producing carbon nanotubes and dispersal in a solvent by any suitable technique or techniques. In an example, the dispersal may include the addition or use of a surfactant, such as, for example, sodium dodecyl sulfate, NaDS ($C_{12}H_{25}SO_4Na$). In some examples, the solution may be treated to remove amorphous carbon, aC, that may be present after carbon nanotubes production using any suitable process.

Figure 2:
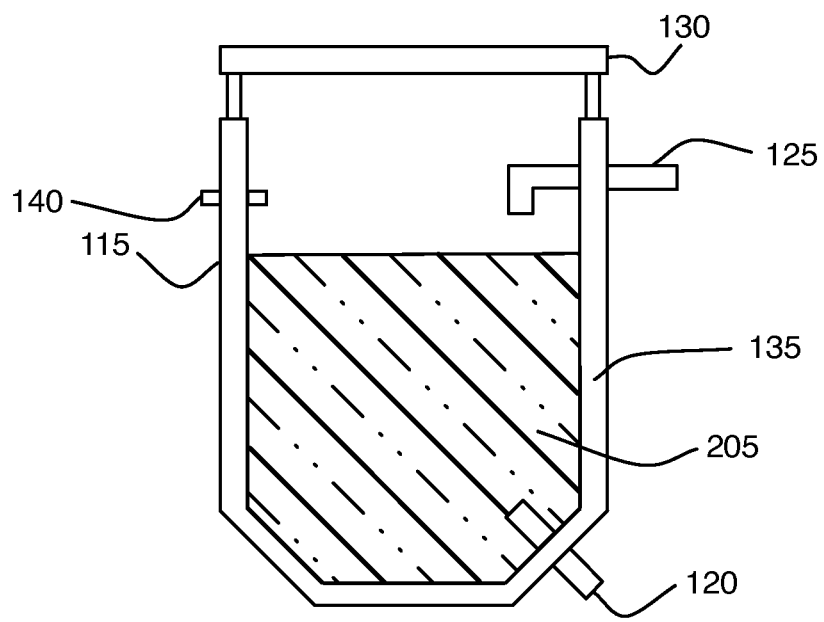

As shown in FIG. 2, a gel 205 may be formed. In an embodiment, a gelling agent may be added to solution 105 to form gel 205. The gelling agent may be added to vessel 115 in any suitable manner, for example, using port 125 or by removing cover 130. In some examples, the gelling agent may be added to vessel 115 under the control of a computer system. The gelling agent may non-covalently cross-link with some of the carbon nanotubes to form gel 205. In various examples, the gelling agent may include an amine having two or more functional groups, such as, for example, a bi-functional or poly-functional amine. In various examples, the amine may include an organic amine. In some examples, the amine may be a long chain molecule or a polymer. In some examples, the amine may be a bi-functional amine having two functional groups, such as, for example, diaminobutane, polyoxyethl bis(amine), or the like. In some examples, the amine may be a poly-functional amine having more than two functional groups, such as, for example, polyethylene amine. In some examples, the amine may include an organic amine that may be substantially soluble in the solvent the amine may be dispersed in. In some examples, more than one amine may be added to form the gel.

In another embodiment, a gel may be added to solution 105 to form gel 205. In such embodiments, gel 205 may be characterized as an expanded or swelled gel, such that the added gel may expand upon exposure to solution 105 such that the gel includes the carbon nanotubes. In some examples, a supernatant liquid may be formed over the expanded gel (not shown in FIG. 2). In some examples, the added gel may include an amine that may include an inorganic amine, for example, and the gel may be characterized as an inorganic amine based gel. The expanded or swelled gel may be characterized as an expanded inorganic amine based gel. In various examples, the amine may include bi-functional amines or poly-functional amines. In some examples, the added gel may include a cross-linked polyamine. In some examples, the gel may include a solvent, such as, for example, n-methylpyrrolidone. In some examples, more than one inorganic amine may be added to form the gel.

Although discussed separately above, in some examples, a gelling agent and a gel may be used in combination. And in some examples, organic and inorganic amines may be used together to form a gel.

Figure 3:
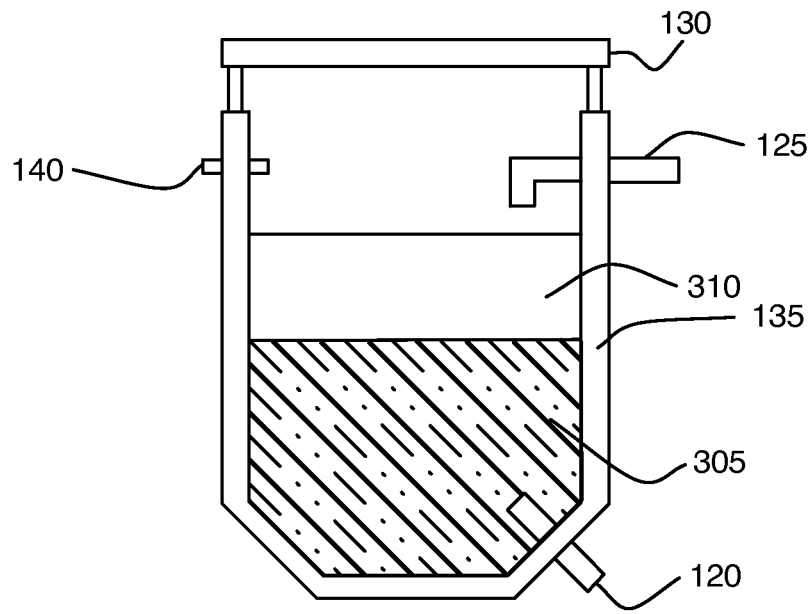

As illustrated in FIG. 3, gel 205 may be compacted to form a compacted gel 305 and a liquid 310. In some examples, the liquid may be characterized as a supernatant. The gel may be compacted in any suitable manner. In various examples, the compaction may include centrifugation, cooling (by any suitable heat transfer process, such as, for example, running cool water in process jacket 135 around process unit 100), adding a co-solvent, or the like. In some examples, the compaction may be effected under the control of a computer system. In various examples, compacted gel 305 may be rich in one type of carbon nanotubes and liquid 310 may be rich in another type of carbon nanotubes. In an example, compacted gel 305 may be rich in semiconducting carbon nanotubes and liquid 310 may be rich in metallic carbon nanotubes.

In some examples, solution 105 may include two types of carbon nanotubes at a weight ratio. For example, the two types of carbon nanotubes in solution 105 may have about the same weight ratio and the ratio may be 1:1. In various examples, solution 105 may include any weight ratio. In the compacted gel and the liquid, the weight proportions may vary from the original weight ratio such that a separation may be achieved. In some examples, a pure separation or a substantially pure separation may occur, such that all of one type of carbon nanotubes may be in the compacted gel and all of another type of carbon nanotubes may be in the liquid. In other examples, the separation may not be perfect, and the weight ratio of one type of carbon nanotube to another type may increase in the compacted gel and decrease in the liquid. As will be discussed below, based at least in part on a weight ratio (or other suitable purity measurement), it may be determined whether the separation process may be repeated. The separation achieved may depend on a variety of factors, such as, for example, the types of carbon nanotubes being separated, the amount of compaction, the type of solvent, the type of gelling agent(s) and/or gels used to form the gel to be compacted, and environmental factors, such as, for example, temperature and pressure.

Figure 4:
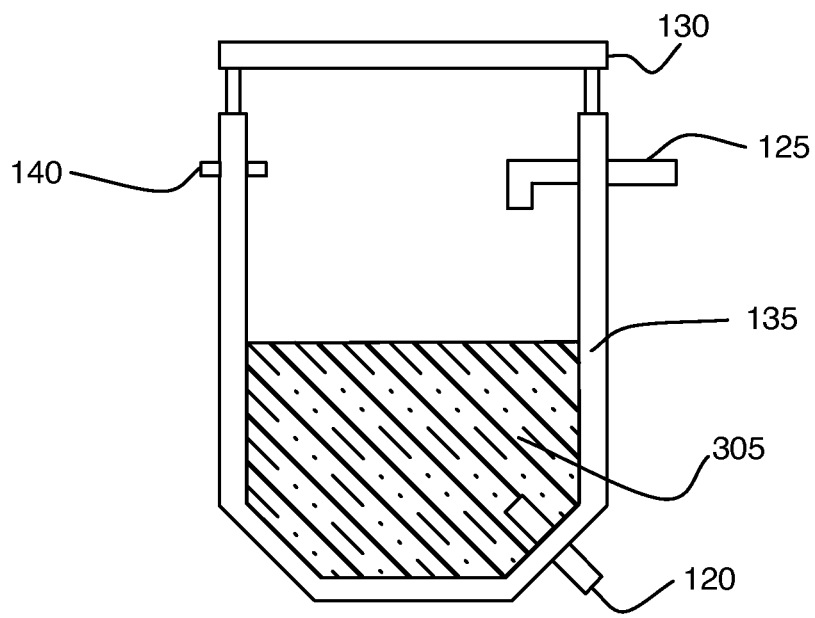

As illustrated in FIG. 4, a portion or substantially all of liquid 310 may be removed. Liquid 310 may be removed for further processing, such as, for example, purification of the carbon nanotubes it may contain or for repeated separation processing, as is discussed further below. In some examples, the carbon nanotubes in liquid 310 may be removed or purified. The carbon nanotubes may be removed by any suitable technique that may remove them from the solvent, such as, for example, a precipitation and wash process, a drying and heating process, an evaporative process, a dissolution process by adding a co-solvent, or the like. In some examples, liquid 310 may be discarded as it may contain carbon nanotubes or other materials that may not be the target result of the separation processing.

Figure 5:
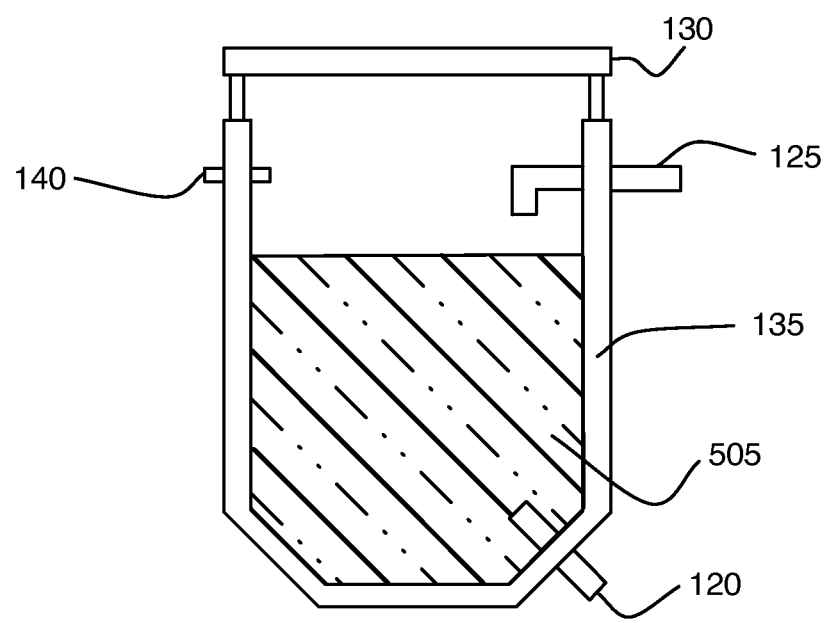

As shown in FIG. 5, compacted gel 305 may be dispersed to form gel 505. Gel 505 may be characterized as a dispersed gel or as a redispersed gel. The dispersion may be performed in any suitable manner, such as, for example, heating, agitating, stirring, adding additional solvent, adding preheated solvent or the like. In some examples, several methods may be used in combination to disperse the gel. In an example, the dispersion may include a heating and cooling cycle. In some examples, the dispersion may be effected under the control of a computer system. Gel 505 may be removed, for example, using port 120 for further processing, such as, for example, purification of the carbon nanotubes it may contain or for repeated separation processing. The carbon nanotubes may be removed from the dispersed gel by any suitable technique, such as, for example, a precipitation and wash process, a drying and heating process, an evaporative process, a dissolution process by adding a co-solvent, or the like. In some examples, the carbon nanotube removal may be implemented under the control of a computer system. In some examples, gel 505 (or gel 305) may be discarded as it may contain carbon nanotubes or other materials that may not be target of the separation processing.

Figure 6:
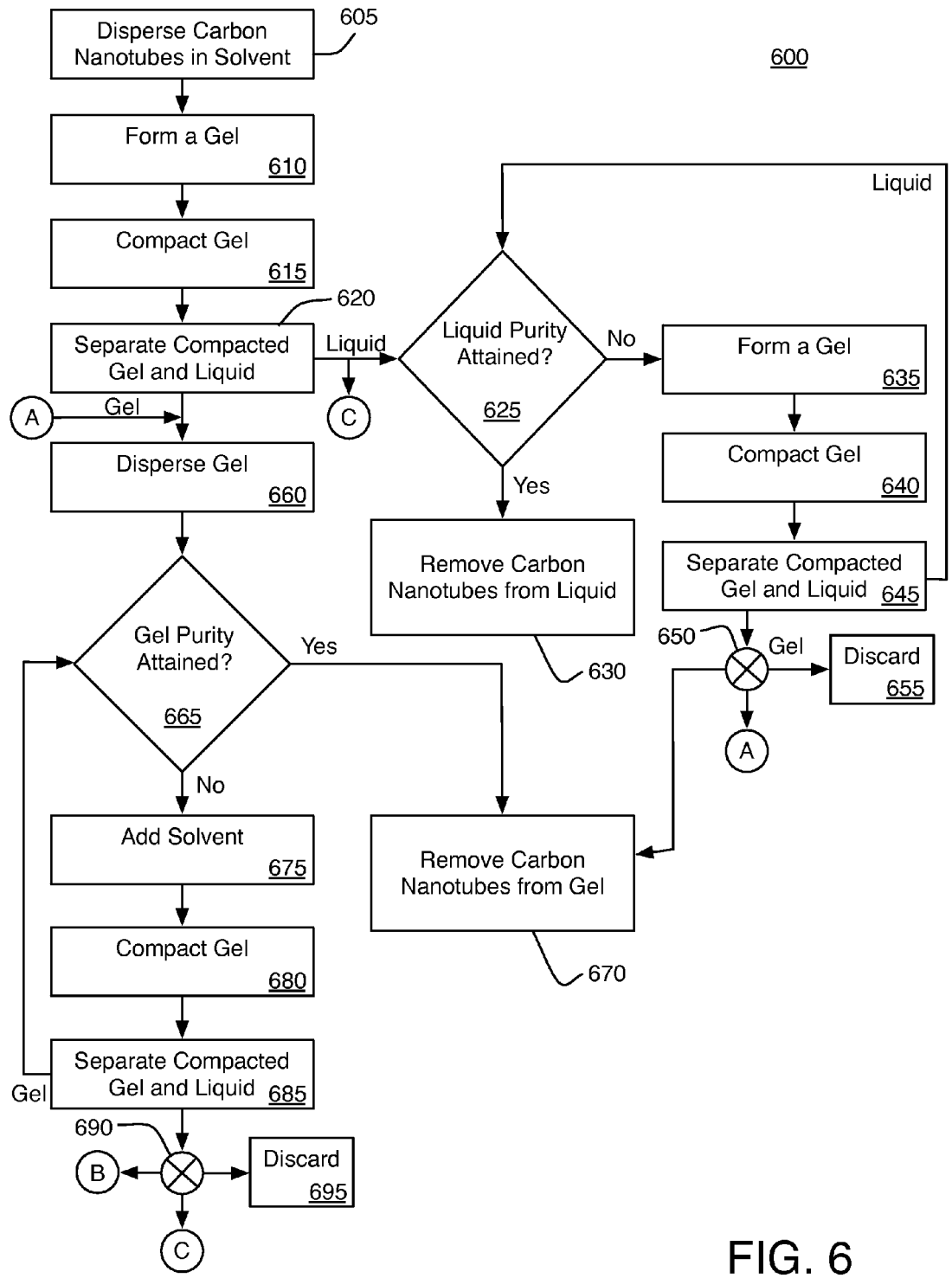
FIG. 6 illustrates a flowchart for an example method for separating carbon nanotubes.

FIG. 6 illustrates a flowchart for an example method for separating carbon nanotubes in accordance with at least some embodiments of the present disclosure. A method 600 may provide for separating and purifying a solution of dispersed carbon nanotubes. Method 600 may include one or more functional operations or actions as illustrated by blocks 605-695. In some examples, method 600 may be implemented under the control of a computer system, as is discussed further below.

At block 605, a mixture or solution of carbon nanotubes dispersed in a solvent may be provided or attained by a variety of carbon nanotube production techniques. Any of the mixtures of two or more types of carbon nanotubes as discussed above may be provided. At block 610, a gel may be formed, for example, by adding a gelling agent or adding a gel that may be expanded, as discussed above with reference to FIG. 2. At block 615, the gel may be compacted, for example as discussed above with reference to FIG. 3, to form a compacted gel and a liquid. At block 620, the compacted gel and the liquid may be separated in any suitable manner discussed above with reference to FIG. 4, for example.

At block 625, the purity of the liquid may be analyzed to determine whether it meets a desired or predetermined purity. In an example, the purity may be determined based on sample measurements and results such as, for example, the weight ratio of one type of carbon nanotube to another type in the liquid. The sample measurements may include measurements of liquid samples using any suitable measurement equipment, such as, for example, chromatography equipment, spectroscopy equipment, mass spectrometry equipment, crystallography equipment, electron microscopes, or lab on a chip equipment. In some examples, the measurement equipment may be operated under the control of a computer system. In some examples, the measurement equipment may be integrated with the process unit. In an example, the weight ratio may be a weight ratio of metallic carbon nanotubes to semiconducting carbon nanotubes. The desired purity may be a weight ratio in the range of about 0.7 to 1.0, for example. In other examples, the purity attained may be assumed based at least in part on past results, experimental results, or process modeling. For example, for separating various types of carbon nanotubes, previous results or experimental extrapolations may allow for the purity to be assumed based at least in part on, for example, whether performing one separation procedure was sufficient to achieve the desired purity.

If the desired purity is determined to be obtained at block 625 for example, by a computer system, the method may continue at block 630. At block 630, the carbon nanotubes in the liquid (rich in a particular type of carbon nanotubes, for example, metallic carbon nanotubes) may be removed from the liquid. The removal may be a purification or a harvesting, for example. The removal of carbon nanotubes from the liquid may include any suitable process as discussed above.

If the desired purity is determined to not be obtained at block 625, the method may continue at block 635 and another gel may be formed, as discussed above, such as, for example, with reference to FIG. 2. If gelling agents are used, the gelling agent may be the same as the gelling agent added at block 610 or it may be different. If gels are added to form expanded gels, the added gel may be the same or it may be different. At block 640, the gel may be compacted in any manner as discussed above to form a compacted gel and a liquid. At block 645, the compacted gel and the liquid may be separated, as discussed above. At block 625, it may be determined whether a desired purity of the liquid may have been obtained and the process may continue to block 630 or it may repeat as needed before the carbon nanotubes are removed from a liquid at block 630. In some examples, a number of process repeats or a counter for example, under the control of a computer system, may be used to determine whether a desired purity has been attained, such that experimental testing, for example, may not be required.

As discussed, at block 645, the compacted gel and the liquid may be separated. At decision point 650, it may be determined what processing the gel may be subjected to. In some examples, the gel may be added to a previously attained gel for further processing and, for example, the gel may be added to the gel attained at block 620 prior to processing, as shown in method 600 by the gel being added prior to the processing illustrated at block 660. In other examples, the gel may be dispersed, as discussed above, prior to being added to a previously attained gel, such as, for example, it may be added prior to the processing illustrated at block 665 (not shown). In some examples, the carbon nanotubes may be removed from the gel, as shown at block 670. In some examples the gel may be dispersed (not shown) prior to the removal of the carbon nanotubes. In other examples, the gel may be discarded, as shown at block 655. At block 650, the decision may be made based on a variety of suitable factors, such as, for example, the desired product results, the types of carbon nanotubes being separated, the purity of the gel, process economics or the like. In some examples, the decision may be implemented under the control of a computer system.

As discussed, a compacted gel and a liquid may be separated at block 620. At block 660 the compacted gel (and any gel added to it) may be dispersed in any manner as discussed above, for example, as discussed with reference to FIG. 5. At block 660, the purity of the gel may be determined and compared with a desired or predetermined purity. In an example, the purity may be determined based on sample measurements and results such as, for example, the weight ratio of one type of carbon nanotube to another type in the dispersed gel. The sample measurements may include measurements of gel samples using any suitable measurement equipment, such as, for example, chromatography equipment, spectroscopy equipment, mass spectrometry equipment, crystallography equipment, electron microscopes, or lab on a chip equipment. In some examples, the measurement equipment may be operated under the control of a computer system. In some examples, the measurement equipment may be integrated with the process unit. Based at least in part on the comparison, the processing for the dispersed gel may be determined. In an example, the purity may be determined based on sample measurements and results such as, for example, the weight ratio of one type of carbon nanotube to another type. In an example, the weight ratio may be a weight ratio of semiconducting carbon nanotubes to metallic carbon nanotubes. The desired purity may be a weight ratio in the range of about 0.7 to 1.0, for example. In other examples, the purity attained may be assumed based at least in part on past results or experimental extrapolations that may allow for the purity to be assumed based at least in part on, for example, whether performing one separation procedure was sufficient to achieve the desired purity.

If the desired purity is determined to be obtained at block 665, the method may continue at block 670. At block 670, the carbon nanotubes in the gel, which may be rich in a particular type of carbon nanotubes, for example, metallic carbon nanotubes, may be removed from the dispersed gel, as discussed above. The removal may include any suitable process, as discussed above.

If the desired purity is determined to not be obtained at block 665, the method may continue at block 675. At block 675, solvent may optionally be added to the dispersed gel. In some examples, solvent may not be added to the dispersed gel and block 675 may be skipped. At block 680, the gel may be compacted in any manner as discussed above and, for example, as discussed with reference to FIG. 3, to form a compacted gel and a liquid. At block 685, the compacted gel and liquid may be separated as discussed above. As shown, the gel may be again checked for purity, as shown at block 665. In some examples, a number or process repeats or a counter, for example, under the control of a computer system, may be used to determine whether a desired purity has been attained, such that experimental testing, for example, at each process repeat, may not be required. For example, the counter value may be compared to a predetermined value to determine whether processing may be continued at block 670 (if the counter value and the predetermined value match, for example) or at block 675 (if the counter value is less than the predetermined value, for example).

At decision point 690, it may be determined what processing the liquid may be subjected to. In some examples, the liquid may be added to a previously attained liquid for further processing and, for example, the liquid may be added to the liquid attained at block 620 prior to processing, as shown at block 660. In some examples, the carbon nanotubes in the liquid may be removed by any suitable process as discussed above, as shown at block 630. In other examples, the liquid may be discarded, as shown at block 695.

Although method 600 has been discussed with respect to separating two types of carbon nanotubes from a mixture, in other examples, the method may include the separation of more than two types of carbon nanotubes. In some examples, one type of carbon nanotubes may be separated to the liquid and two types of carbon nanotubes may be separated to the gel. The carbon nanotubes in the liquid may be removed, as discussed. In an example, the gel, containing two types of carbon nanotubes, for example, may be dispersed and another separation method, similar to those discussed, may be performed to separate those two types of carbon nanotubes. In a similar manner, the discussed techniques may be extended to separate any number of types of carbon nanotubes so long as at least some of those types of carbon nanotubes may have different affinities for the liquid phase and the gel phase.

Although the discussion herein has focused on batch processing techniques, the techniques may be extended to continuous processing techniques. For example, a solution having two or more types of carbon nanotubes may be continuously introduced to a processing environment, such as, for example, a continuous flow vessel, including a gel phase and a liquid phase. Portions of the liquid phase and the gel phase may be continuously removed and gelling agents and solvents, for example, may be continuously added to the process. In such a system, a steady-state may be reached such that the liquid phase is rich in one or more types of carbon nanotubes while the gel phase is rich in one or more other types of carbon nanotubes. In some examples, the gel and liquid phases may be subjected to various temperatures and pressures to alternatively compress and relax or re-disperse the gel. In some examples, the removal and/or addition of materials may be timed such that they are removed and/or added when the gel is dispersed. In various examples, the materials and techniques discussed above may be implemented in such a continuous process flow.

Figure 7:
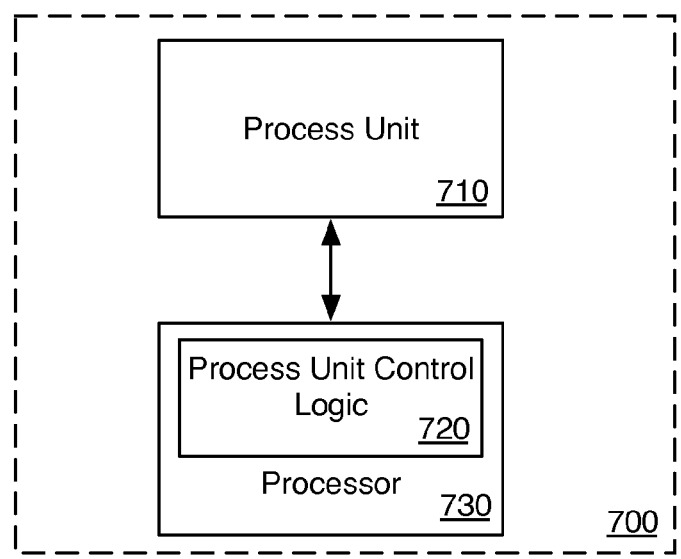
FIG. 7 illustrates an example system for the separation of carbon nanotubes.

Turning now to other embodiments that may perform any of the methods as discussed above, FIG. 7 illustrates an example system 700 for the separation of carbon nanotubes in accordance with at least some embodiments of the present disclosure. System 700 may be used to perform some or all of the functions discussed above in connection with FIGS. 1-6. System 700 may include a process unit 710 operably coupled to a processor 730 that may include process unit control logic 720. Process unit 710 may include any or all of the process unit characteristics as discussed above. In some examples, process unit 710 may include a vessel, various ports, various pressure ports, a process jacket, one or more agitators, and a cover. Those components may be housed in a centrifugation chamber or they may be configured such that some or all of them may be added to and removed from a centrifugation chamber. The process unit may also include electro-mechanical devices that may be utilized to actuate the various components. In some examples, the ports may include or be in-line with valves that may be operable under applied signals, such as, for example, communication signals. In some examples, the ports may be connected to additional vessels that may provide the materials, such as, for example, a solution having carbon nanotubes for separation, gelling agents, solvents and the like. In some examples, the ports may be attached to vessels that may collect materials, such as, for example, dispersed gels enriched in carbon nanotubes, waste solvents, liquids enriched in carbon nanotubes, and the like. In some examples, a variety of ports may be included such that each process material has a port to the vessel. In other examples, a manifold or manifolds may be provided such that a variety of process materials may be removed or added using one port (or a few ports). In some examples, the cover may be operable by a motor or other device such that it may be removed under the operation of applied signals, such as, for example, communication signals. In some examples, a liquid flow through a process jacket may be controlled under the operation of applied signals, such as, for example, communication signals.

In some examples, system 700 may include a processor 730. In some examples, processor 730 may be implemented as part of a computer system. System 700 may include process unit control logic 720 that may be configured to undertake various methods, functional operations, actions, and/or blocks such as those described previously for FIG. 1-6. Further, system 700 may include additional items such as memory, a router, network interface logic, etc. Process unit control logic 720 may be configured to provide any of the functionality described herein and claimed subject matter is not limited to specific types or manifestations of processing logic. For example, processor 730 may be a microprocessor or Central Processing Unit (CPU). In other implementations, processor 730 may be an Application Specific Integrated Circuit (ASIC), a Field Programmable Gate Array (FPGA), a digital signal processor (DSP), or other integrated formats. Processor 730 and process unit 710 may communicate by any suitable means, such as, for example, by wired connections or wireless connections.

FIG. 8 illustrates an example computer program product 800 arranged in accordance with at least some embodiments of the present disclosure. Program product 800 may include a signal bearing medium 802. Signal bearing medium 802 may include one or more instructions 804 that, when executed by, for example, a processor, may provide the functionality described above with respect to FIGS. 1-6 and the related disclosure. In some examples, a processor may provide one or more instructions for formatting data to instruct a process unit to provide the functionality described above with respect to FIGS. 1-6 and the related disclosure. Thus, for example, a processor may undertake one or more of the blocks shown in FIG. 6 in response to instructions 804 conveyed by medium 802.

In some implementations, signal bearing medium 802 may encompass a computer-readable medium 806, such as, but not limited to, a hard disk drive, a Compact Disc (CD), a Digital Video Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be wirelessly conveyed by signal bearing medium 802, where signal bearing medium 802 is conveyed to an implementing device by a wireless communications medium 810 (e.g., an wireless communications medium conforming with the 802.11 standard).

Figure 9:
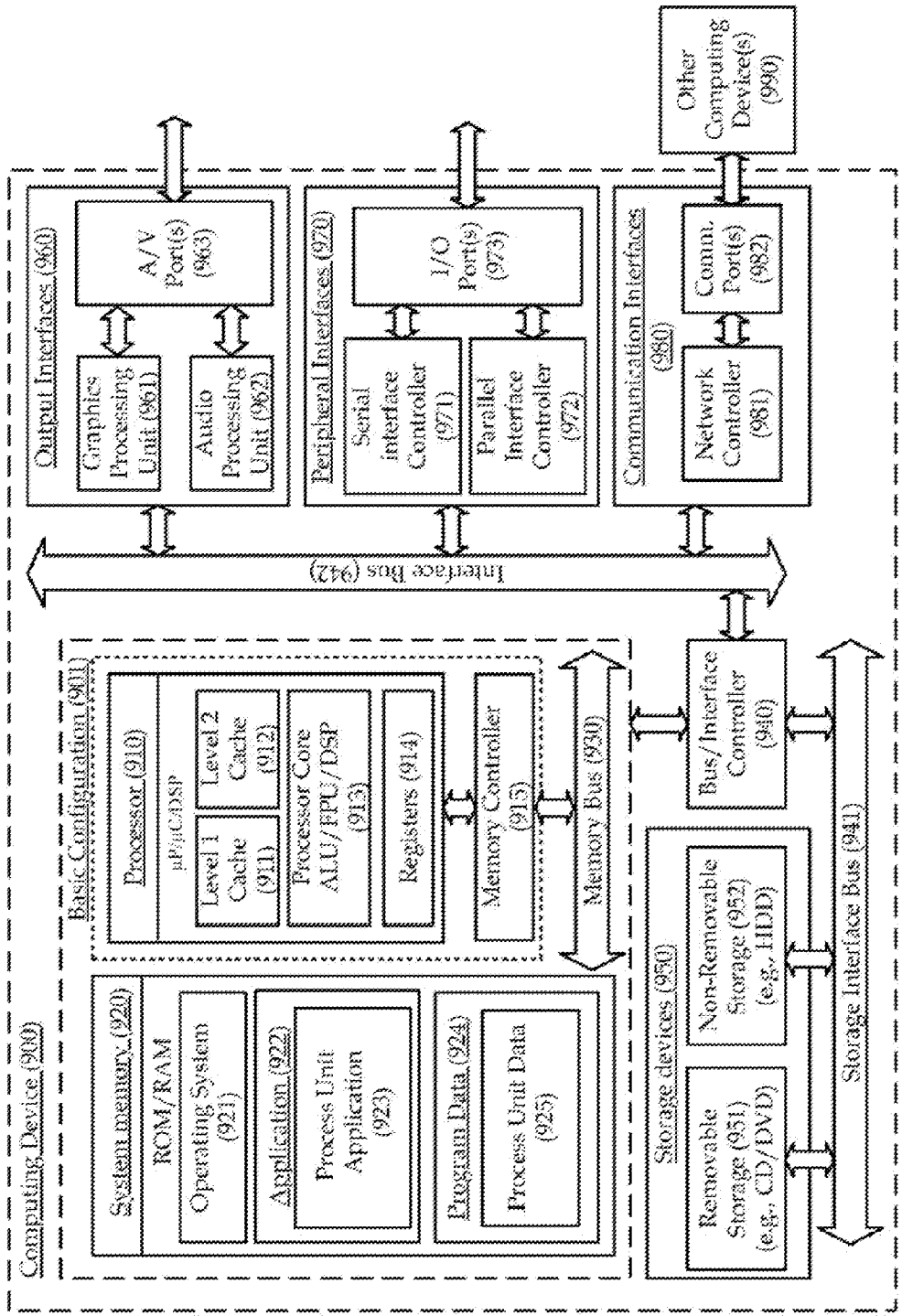
FIG. 9 is a block diagram illustrating an example computing device, all arranged in accordance with at least some embodiments of the present disclosure.

FIG. 9 is a block diagram illustrating an example computing device 900 arranged for controlling a process unit to separate carbon nanotubes in accordance with at least some embodiments of the present disclosure. In a basic configuration 901, computing device 900 may include one or more processors 910 and system memory 920. A memory bus 930 may be used for communicating between processor 910 and system memory 920.

Depending on the configuration, processor 910 may be of any type including, but not limited to, a microprocessor (µP), a microcontroller (µC), a digital signal processor (DSP), or any combination thereof. Processor 910 may include one or more levels of caching, such as a level one cache 911 and a level two cache 912, a processor core 913, and registers 914. The processor core 913 may include an arithmetic logic unit (ALU), a floating point unit (FPU), a digital signal processing core (DSP Core), or any combination thereof. A memory controller 915 may be used with processor 910, or memory controller 915 may be an internal part of the processor 910.

Depending on the desired configuration, system memory 920 may be of any type including, but not limited to, volatile memory (such as RAM), non-volatile memory (such as ROM, flash memory, etc.) or any combination thereof. System memory 920 may include an operating system 921, one or more applications 922, and program data 924. Application 922 may include an process unit application 923 to perform functions described herein including, but not limited to, the methods, functional operations, actions or blocks described with respect to FIGS. 1-6 and the associated disclosure. In some examples, the process unit application may provide one or more instructions for to instruct a process unit to provide the functionality described above with respect to FIGS. 1-6 and the related disclosure. Program Data 924 may include process unit data 925 for use in process unit application 923, for example, data corresponding to process unit control, control of various process unit components, and the like. In some embodiments, application 922 may be arranged to operate with program data 924 on an operating system 921 such that implementations of carbon nanotube separation may be provided as described herein. This described basic configuration is illustrated in FIG. 9 by those components within dashed line 901.

Computing device 900 may have additional features or functionality, and additional interfaces to facilitate communications between the basic configuration 901 and any required devices and interfaces. For example, a bus/interface controller 940 may be used to facilitate communications between the basic configuration 901 and one or more data storage devices 950 via a storage interface bus 941. Data storage devices 950 may be removable storage devices 951, non-removable storage devices 952, or a combination thereof. Examples of removable storage and non-removable storage devices may include magnetic disk devices such as flexible disk drives and hard-disk drives (HDD), optical disk drives such as compact disk (CD) drives or digital versatile disk (DVD) drives, solid state drives (SSD), or tape drives, or the like. Example computer storage media may include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of device 900.

Computing device 900 may include an interface bus 942 for facilitating communication from various interface devices (e.g., output interfaces, peripheral interfaces, and communication interfaces) to basic configuration 901 via the bus/interface controller 940. Example output interfaces 960 include a graphics processing unit 961 and an audio processing unit 962, which may be configured to communicate to various external devices such as a display or speakers via one or more NV ports 963. Example peripheral interfaces 970 include a serial interface controller 971 or a parallel interface controller 972, which may be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which may be arranged to facilitate communications with one or more other computing devices 990 over a network communication via one or more communication ports 982. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that may have one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) or other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 900 may be implemented as a personal computer including both laptop computer and non-laptop computer configurations. In addition, computing device may be implemented as part of a system for separating carbon nanotubes, such as, for example, system 700 described above with respect to FIG. 7.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," "other implementations," "an example," "some examples," "various examples," or "other examples" may mean that a particular feature, structure, or characteristic described in connection with one or more implementations or examples may be included in at least some implementations or examples, but not necessarily in all implementations or examples. The various appearances of "an implementation," "one implementation," "some implementations," "an example," "some examples," "various examples," or "other examples" in the preceding description are not necessarily all referring to the same implementations or examples.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may be viewed as being "operably connected", or "operably coupled", to each other to achieve the desired functionality, and any two components capable of being so associated may be viewed as being "operably couplable", to each other to achieve the desired functionality. Specific examples of operably couplable include, but are not limited to, physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an"

should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A composition comprising:
   a gelling agent including an organic amine having two or more functional groups; and
   a solution having a first type of carbon nanotubes with an affinity or miscibility for inclusion in a gel such that the gelling agent non-covalently cross-links with at least a portion of the first type of nanotubes to form the gel, and a second type of carbon nanotubes with a different affinity or miscibility from the first type of carbon nanotubes such that the first type of carbon nanotubes and the second type of carbon nanotubes are separated through a compaction of the gel causing the second type of carbon nanotubes to be removed as a liquid.

2. The composition of claim 1, wherein the first type of carbon nanotubes comprise metallic carbon nanotubes and the second type of carbon nanotubes include semiconducting carbon nanotubes.

3. The composition of claim 1, wherein the organic amine comprises a bi-functional amine.

4. The composition of claim 1, wherein the organic amine comprises a poly-functional amine.

5. The composition of claim 1, wherein the organic amine comprises at least one of diaminobutane, polyoxyethyl bis (amine), or polyethylene amine.

6. The composition of claim 1, wherein the composition further comprises a surfactant.

7. The composition of claim 6, wherein the surfactant comprises sodium dodecyl sulfate.

8. A composition comprising:
   a gel including an amine; and
   a solution having a first type of carbon nanotubes with an affinity or miscibility for inclusion in the gel such that the amine of the gel non-covalently cross-links with at least a Portion of the first type of nanotubes to form an expanded gel, and a second type of carbon nanotubes with a different affinity or miscibility from the first type of carbon nanotubes such that the first type of carbon nanotubes and the second type of carbon nanotubes are separated through a compaction of the expanded gel causing the second type of carbon nanotubes to be removed as a liquid.

9. The composition of claim 8, wherein the first type of carbon nanotubes comprise metallic carbon nanotubes and the second type of carbon nanotubes include semiconducting carbon nanotubes.

10. The composition of claim 8, wherein the amine comprises at least one of a bi-functional amine or a poly-functional amine.

11. The composition of claim 8, wherein the gel comprises a cross-linked polyamine.

12. The composition of claim 8, wherein the gel comprises a solvent.

13. The composition of claim 12, wherein the solvent comprises n-methylpyrrolidone.

14. A composition comprising:
   an inorganic amine based gel; and
   a solution having a first type of carbon nanotubes with an affinity or miscibility for inclusion in the gel such that an inorganic amine of the inorganic amine based gel non-covalently cross-links with at least a portion of the first type of nanotubes to form an expanded gel, and a second type of carbon nanotubes with a different affinity or miscibility from the first type of carbon nanotubes such that the first type of carbon nanotubes and the second type of carbon nanotubes are separated through a compaction of the expanded gel causing the second type of carbon nanotubes to be removed as a liquid.

15. The composition of claim 14, wherein the first type of carbon nanotubes comprise metallic carbon nanotubes and the second type of carbon nanotubes include semiconducting carbon nanotubes.

16. The composition of claim 14, wherein the amine comprises at least one of a bi-functional amine or a poly-functional amine.

17. The composition of claim 14, wherein the gel comprises a cross-linked polyamine.

18. The composition of claim 14, wherein the gel comprises a solvent.

* * * * *